United States Patent

[11] 3,579,792

[72] Inventor Edward H. Craver
    Clemmons, N.C.
[21] Appl. No. 862,235
[22] Filed Sept. 30, 1969
[45] Patented May 25, 1971
[73] Assignee Western Electric Company, Incorporated
    New York, N.Y.

[54] APPARATUS FOR ASSEMBLING PIECEPARTS INTO CUP-SHAPED ADAPTERS
7 Claims, 9 Drawing Figs.
[52] U.S. Cl. .................................................. 29/208,
                                                            29/211
[51] Int. Cl. ...................................... B23p 19/04,
                                                      B23q 7/10
[50] Field of Search ........................................ 29/208, 211
                                                                (C)

[56] References Cited
UNITED STATES PATENTS
2,433,066 12/1947 Rund ........................... 29/208(X)

FOREIGN PATENTS
659,357 3/1963 Canada ........................ 29/208

Primary Examiner—Theron E. Condon
Assistant Examiner—E. F. Desmond
Attorneys—W. M. Kain, R. P. Miller and B. I. Levine ABSTRACT: A loading apparatus assembles a ferrite core into a cup-shaped adapter. First the adapter is pushed to an assembly station to receive the ferrite core where it is accurately positioned by a slanted end of a pusher and a corner. The ferrite core is then pushed to the assembly station where it is held between a pusher and a spring-biased member in an elevated position over the adapter. The cores are fed from a stack where a pronged member gently lowers the stack after a pusher has retracted. A spring-biased plunger at the assembly station pushes the ferrite core down into the adapter. A switch on the plunger senses any failure of the ferrite core to assemble into the adapter to release an ejection mechanism to drop the unassembled ferrite core and adapter from the assembly station.

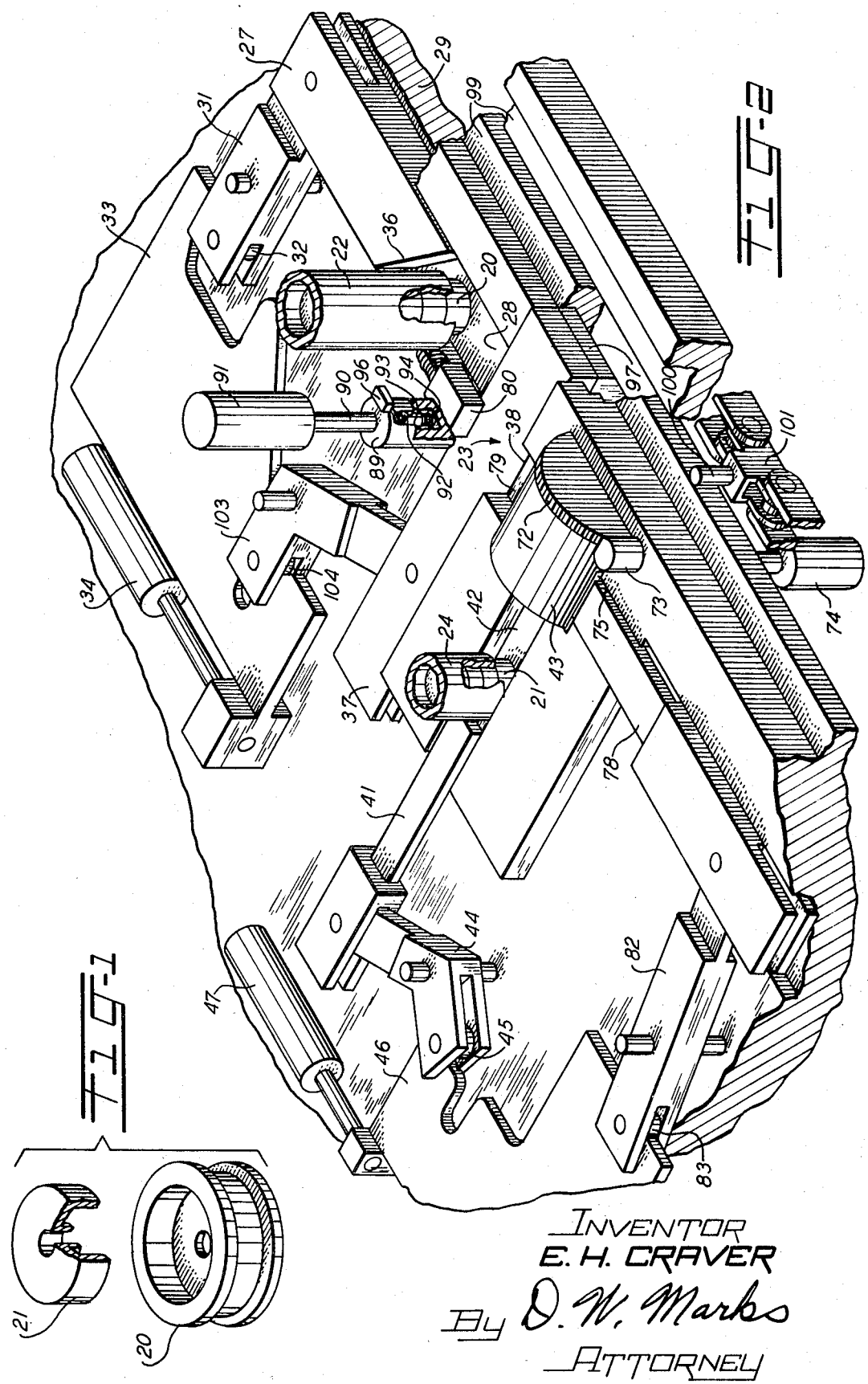

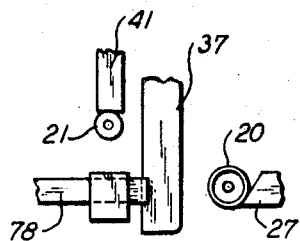
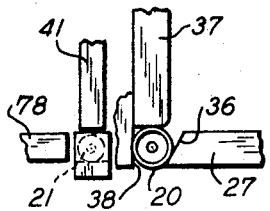
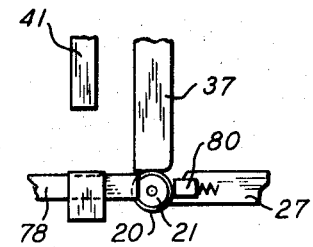
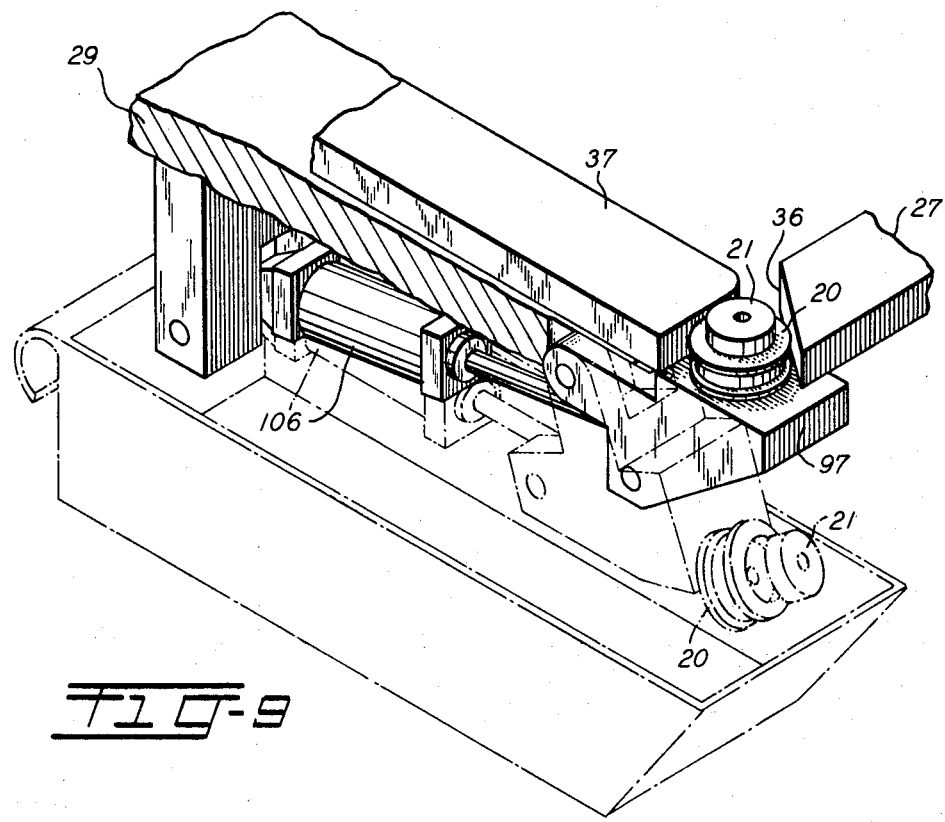

APPARATUS FOR ASSEMBLING PIECEPARTS INTO CUP-SHAPED ADAPTERS

BACKGROUND OF THE INVENTION

1. Field of the Invention

In the manufacture of the ferrite cores, an automatic testing apparatus is utilized to test the magnetic properties of the ferrite cores. Facilities are provided for mechanically handling the ferrite cores. A variety of different sizes and shapes of ferrite cores must be handled by the testing apparatus. Additionally, the ferrite cores are brittle and susceptible to chipping and the creation of a dust which is abrasive on machine parts. For these reasons, it is desired to assemble the ferrite cores into a nonmagnetic adapter which has a uniform outside diameter and can be easily handled to transport the ferrite cores to various stations.

2. Description of the Prior Art

There are many varieties of apparatus for assembling various articles in the prior art. Generally, the prior art apparatus is unsuitable and unduly complex for use in assembling ferrite cores into the nonmagnetic adapters. Ferrite dust, chippings, etc., could easily foul up many of the prior art apparatus.

SUMMARY OF THE INVENTION

An object of the present invention is an apparatus for assembling pieceparts into cup-shaped adapters or receptacles which is relatively simple and reliable in operation.

In accordance with these and other objects, an apparatus of assembling pieceparts into cup-shaped adapters or receptacles includes a first pusher for feeding the adapter from a stack to an assembly station. The first pusher has a slanted end to accurately position the adapter in a corner. The piecepart is fed from a stack to the assembly station by a second pusher where the piecepart is held in an elevated position between the second pusher and a spring-biased member over the adapter. A spring-biased plunger then pushes the piecepart down into the adapter. A switch on the plunger senses any failure of the piecepart to assemble into the adapter to cause rejection of the unassembled piecepart and adapter.

Another feature of the invention incorporates a pronged member for straddling the second pusher to hold the stack of pieceparts in an elevated position as the second pusher retracts and to gently lower the stack of pieceparts after the second pusher has retracted.

BRIEF DESCRIPTION OF THE DRAWINGS

FIG. 1 shows a ferrite core which may be assembled into an adapter by the apparatus of the invention;

FIG. 2 is a general isometric view of an apparatus embodying the principles of the invention;

FIGS. 6—8 show the sequence of operation of various pushers in the apparatus of FIG. 2; and FIG. 9 shows a reject mechanism for dropping pieceparts and receptacles from the assembly station where there has been a failure of the assembly operation in the apparatus of FIG. 2.

DETAILED DESCRIPTION

Figure 3:
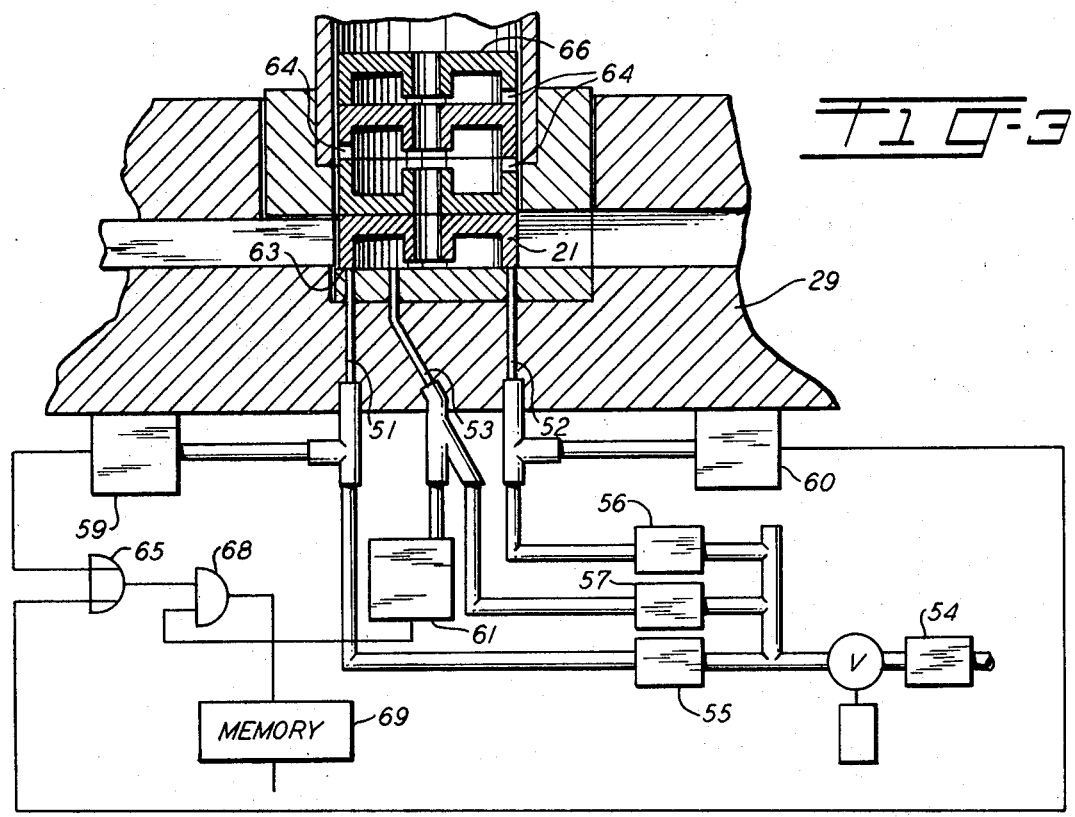
FIG. 3 shows a piecepart orientation sensing mechanism in the apparatus of FIG. 2.

Referring first to FIG. 1, there is shown a cup-shaped adapter or receptacle 20 for receiving a ferrite core 21. The adapter may have a variety of inside diameters and shapes to accommodate a variety of sizes of ferrite cores while maintaining the same outside dimensions designed to be handled by the assembly apparatus. The adapter 20 is made of a nonmagnetic material, such as aluminum, stainless steel, etc., which is tough and wear resistant.

Referring not to FIG. 2, the adapters 20 are fed from a magazine 22 to an assembly station 23 by a pusher 27 pushing the lowermost adapter from the magazine 22 along a groove 28 in a base 29 to the assembly station 23. The pusher 27 is pivotally connected to an arm 31 which has a cam follower 32 engaging an adapter feed cam 33. The arm 31 is pivotally mounted on the base 29. The adapter feed cam is slidably mounted on the base 29 by suitable grooves (not shown) in the base 29. An air cylinder and piston arrangement 34 mounted on the base 29 is connected to the cam 33 for moving the cam. When the cam 33 is moved to the right, as shown in FIG. 2, the cam 33 engages against the cam follower 32 to pivot the arm 31 and advance the pusher 27 to move an adapter 20 from the magazine 22 to the assembly station 23.

The pusher 27 has a slanted end 36 having a resilient material, such a rubber, mounted thereon for holding the adapter 20 in a corner formed by the end of a pusher 37 and an edge 38 formed in the base 29 (see FIG. 7). This ensures that the adapter 20 is accurately positioned to receive the ferrite core.

A pusher 41 advances the lower most core 21 from a magazine 24 through a groove 42 in a base 29 into an orientation member 43. The member 43 may be rotated 180° to invert the core 21, if the core is oriented improperly. The pusher 41 is pivotally connected to an arm 44 having a cam follower 45 engaging a core feed cam 46 slidably mounted on the base 29. An air cylinder and piston arrangement 47 mounted on the base 29 is connected to the cam 46 for moving the cam on the base. Suitable grooves (not shown) are formed in the base 29 for guiding the cam 46. When the cam 46 is moved to the right, as viewed in FIG. 2, the arm 44 is pivoted and the pusher 41 is advanced to push the bottom most core 21 from the magazine 24 into the orientation member 43.

Referring now to FIG. 3, three passageways 51, 52 and 53 extend through the base 29 beneath the stack of cores 21. Compressed air is emitted from a source (not shown) through a common regulator 54 and individual regulators 55, 56 and 57 to the respective passageways 51, 52 and 53. Sensitive air switches 59, 60 and 61 are connected to the respective passageways 51, 52 and 53 to operate in response to the pressure within the respective passageways. The regulators 54, 55, 56 and 57 are adjusted such that when an opening of a respective passageway 51, 52 and 53 is covered by a surface of a core 21, the respective switch 59, 60 and 61 is actuated.

The core 21 has an edge 63 which will cover one or both of the two passageways 51 and 52 depending upon the position of a notch 64 formed in the edge 63. Thus, an OR gate 65 connected to the switches 59 and 60 produces an output signal when a core is present on the base 29 in the magazine 24. The passageway 53 is only covered when a core 21 is improperly oriented with the top 66 facing downward. An AND gate 68 connected to the switch 61 and the OR gate 65 produces an output signal when the core 21 is improperly oriented to store a signal in a memory 69.

Referring back to FIG. 2, the orientation member 43 is a cylindrical member having gear teeth 72 meshing with a rack 73 which is operated by an air cylinder and piston arrangement 74 mounted on the base 29 by suitable facilities (not shown). The member 43 has a slot 75 therein for receiving a core 21 from the magazine 24. If a signal has been stored in the memory 69 (see FIG. 3) an appropriate solenoid valve (not shown) is operated to advance or retract the rack 73 to invert the core 21 to its proper orientation.

A pusher 78 advances the core 21 from the slot 75 through a groove 79 in the base 29 to the assembly station 23. The pusher 78 holds the core 21 against a spring-biased block 80 to hold the core 21 in a raised position at the assembly station over an adapter 20. The pusher 78 is pivotally connected to an arm 82 having a cam follower 83 which engages the core feed cam 46. When the core feed cam 46 is moved to the left, as shown in FIG. 2, the arm 82 is pivoted to advance the pusher 78 into the slot 75 and groove 79.

Figure 4:
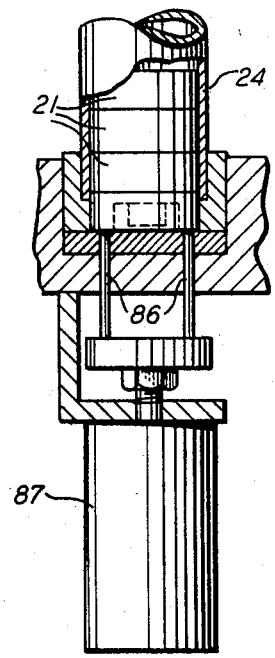
FIGS. 4 and 5 show an apparatus for preventing the breakage of ferrite cores as they are fed from a stack into the apparatus of FIG. 2.
Figure 5:
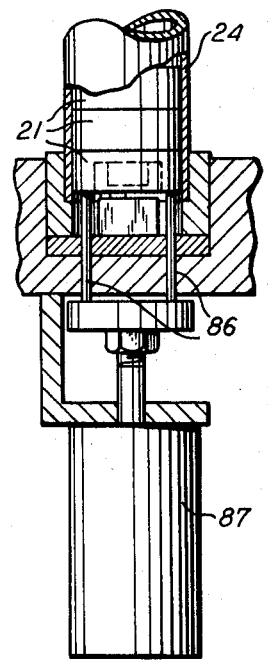

Referring now to FIGS. 4 and 5, there are shown a pair of cushion prongs 86 for lifting the stack of ferrite cores 21 in the magazine 24. The prongs 86 are operated by an air cylinder and piston arrangement 87 mounted on the base 29. After the pusher 41 has advanced to push the lowermost core 21 along the groove 42 (see FIG. 2) to the orientation member 43, the air cylinder and piston arrangement 87 is actuated to raise the cushion prongs 86 to straddle the pusher 41 and hold the cores 21 in a raised position, as shown in FIG. 5. After the pusher 41 has been retracted, the air cylinder and piston arrangement may be operated to slowly retract the prongs 86 and gently lower the stack of ferrite cores 21 onto the base 29, as shown in FIG. 4. This prevents breakage of the cores 21 which would occur if the stack of ferrite cores were dropped upon retraction of the pusher 41.

As shown in FIG. 2, after an adapter 20 has been positioned by the pusher 27 into the corner formed by the edge 38 and the end of the pusher 37 and a core 21 has been positioned between the pusher 78 and the spring-biased block 80, a spring-biased plunger 89 is lowered to push the core 21 from between the pusher 78 and the spring-biased block 80 down into the adapter 20. The plunger 89 is slidably mounted on a piston rod 90 extending from an air cylinder 91 which is mounted on a support (not shown) connected to the base 29. A pin 92 in the piston rod 90 extends through a slot 93 in the plunger 89 to limit the sliding movement of the plunger 89. A spring 94 biases the plunger 89 downward. The spring 94 is selected to have sufficient tension to overcome the friction forces holding the core 21 between the pusher 78 and the spring-biased block 80.

If a failure occurs in that the core 21 does not enter the adapter 20, the spring 94 is depressed and the pin 92 is moved to operate a switch 96 mounted on the plunger 89 to operate an ejecting mechanism which pivots a bottom plate 97 at the assembly station to drop the parts 20 and 21 from the assembly station 23. If the core 21 is properly assembled into the adapter 20, the pusher 37 advances to feed the assembled unit onto a track 99 where it is engaged by a projection 100 from a conveyor chain 101 to advance the assembled unit into the test apparatus. The pusher 37 is pivotally connected to an arm 103 having a cam follower 104 which engages the adapter cam 33.

Referring now to FIG. 9, there is shown the bottom plate 97 pivotally mounted on the base 29. An air cylinder and piston arrangement 106 mounted on the base 29 is operated by a suitable solenoid valve (not shown) which is controlled by the switch 96 (see FIG. 2) to pivot the bottom plate 97 to reject an unassembled core 21 and adapter 20 from the assembly station 23.

OPERATION

Referring to FIGS. 2, 6, 7, and 8, the cams 33 and 46 are initially in their extreme left positions, as seen in FIG. 2, to position the pushers 37 and 78 in their advanced positions and to position pushers 27 and 41 in their retracted positions, as seen in FIGS. 2 and 6. The following sequence of operations are performed to assemble a core 21 into an adapter 20.

Step one is to push an adapter 20 from the magazine 22 to the assembly station 23 by movement of the cam 33 to the right, as viewed in FIG. 2, to retract the pusher 37 and advance the pusher 27. The adapter 20 is accurately positioned at the assembly station 23 by the resilient slanted end 36 securely holding the adapter 20 in the corner formed by the edge 38 and the end of the pusher 37, as shown in FIG. 7.

In step two, the cam 46 is moved to the right, as viewed in FIG. 2, to advance the pusher 41 and retract the pusher 78 to push a core 21 from the magazine 24 into the slot 75 of the orientation member 43. After the pusher 41 has pushed the core 21 from the magazine 24, the air cylinder and piston arrangement 87 is operated to raise the prongs 86 and hold the remaining cores 21 in a raised position, as shown in FIG. 5, until after the pusher 41 has fully retracted in step four below.

In step three, if the core 21 is misoriented, the orientation member 43 is rotated 180° by the cylinder 74 and rack 73 operating in response to the memory 69 (see FIG. 3). If the core is properly oriented, the cylinder 74 remains in its present state.

In step four, the cam 46 is moved back to the left, as viewed in FIG. 2, to retract pusher 41 and advance pusher 78 to push the core 21 from the slot 75 through the groove 79 and into engagement with the spring-biased block 80. The block 80 provides sufficient force to hold the core 21 in a raised position over the adapter 20, as shown in FIG. 8. After the pusher 41 has fully retracted, the air cylinder 87 is operated to slowly retract the prongs 86 to gently lower the stack of cores 21.

In step five, the air cylinder 91 and piston rod 90 (see FIG. 2) are operated to advance the spring plunger 89 downward to push the core 21 from between the pusher 78 and the spring-biased block 80 into the adapter 20. The piston rod 90 is then retracted to its raised position. If there should be a failure of the core 21 to assemble into the adapter 20, the switch 96 on the plunger 89 is operated by movement of the pin 92 to operate the air cylinder 106 (see FIG. 9) to pivot the bottom plate 97 to reject the adapter 20 and core 21.

In step six, the adapter feed cam 33 is moved back to the left, as viewed in FIG. 2, to retract the pusher 27 and advance the pusher 37 to push the assembled adapter 20 and core 21 onto the track 99 where the chain conveyor 101 with projection 100 moves the assembled unit to a subsequent station. The apparatus is now in position to begin another assembly cycle.

Conventional timed control mechanisms, such as a cam switching arrangement operating solenoid valves, may be used to control the sequence of operation of the various air cylinders 34, 47, 74, 87 and 91. As hereinbefore described, the adapter 20 is fed to the assembly station 23 first, and the core 21 is fed to the station 23 next. However, the order of feeding the core 21 and the adapter 20 may be reversed or they may be fed simultaneously.

I claim:

1. An apparatus for assembling a piecepart into a receptacle, comprising:

a base;

means for supporting a stack of piceparts on the base;

means for supporting a stack of receptacles on the base;

a first pusher for moving a receptacle from the lower end of the receptacle stack supporting means to an assembly station in a lowered position to receive a piecepart;

a second pusher for moving a piecepart from the lower end of the piecepart stack supporting means to the assembly station;

a spring-biased member at the assembly station in the path of the piecepart and against which the piecepart is moved, the second pusher and the spring-biased member cooperating to hold the piecepart in an elevated position at the assembly station; and a plunger at the assembly station for pushing the piecepart downward from between the second pusher and the spring-biased member into the receptacle.

2. An apparatus as defined in claim 1, including:

a third pusher for pushing the assembled piecepart and receptacle from the assembly station;

an edge on the base forming a corner with the end of the third pusher when the third pusher is retracted; and a slanted end on the first pusher for pushing the receptacle into the corner formed by the end of the third pusher and the edge on the base to accurately position the receptacle at the assembly station.

3. An apparatus as defined in claim 1, including:

means at the piecepart stack supporting means for gently lowering the stack of piceparts after the second pusher is retracted.

4. An apparatus as defined in claim 3, where the lowering means includes:

an air cylinder and piston means mounted on the base; and a pronged member attached to the cylinder and piston means for straddling the second pusher to hold the stack of pieceparts in an elevated position as the second pusher is retracted and for gently lowering the stack of pieceparts after the second pusher is retracted.

5. An apparatus as defined in claim 1, including:

a floor member pivotally mounted on the base at the assembly station upon which the receptacle is positioned;

spring-biased switching means on the plunger for sensing a failure of the piecepart to assemble into the receptacle; and means responsive to the spring-biased switching means for pivoting the floor member to reject the unassembled piecepart and receptacle from the assembly station.

6. An apparatus as defined in claim 1, including:

a third pusher for pushing the assembled piecepart and receptacle from the assembly station;

an edge on the base forming a corner with the end of the third pusher when the third pusher is retracted;

a slanted end on the first pusher for engaging the receptacle to accurately position the receptacle in the corner formed by the end of the third pusher and the edge of the base at the assembly station;

a floor member pivotally mounted on the base at the assembly station upon which a receptacle is positioned;

spring-biased switching means on the plunger for sensing a failure of the piecepart to assemble into the receptacle; and means responsive to the spring-biased switching means for pivoting the floor member to reject the unassembled piecepart from the assembly station.

7. An apparatus as defined in claim 6, including:

an air cylinder and piston means mounted on the base at the piecepart stack supporting means; and a pronged member attached to the cylinder and piston means for straddling the second pusher to hold the stack of pieceparts in an elevated position as the second pusher is retracted and for gently lowering the stack of pieceparts after the second pusher is retracted.